United States Patent [19]

Zehnder

[11] Patent Number: 4,612,862
[45] Date of Patent: Sep. 23, 1986

[54] THREE LEVEL VEHICLE BODY FOR RAILCARS, WITH FORCE DISTRIBUTING TRIANGULAR SHAPED PLATES

[75] Inventor: Jürg Zehnder, Uitikon, Switzerland

[73] Assignee: Swiss Aluminium Ltd., Chippis, Switzerland

[21] Appl. No.: 596,646

[22] Filed: Apr. 4, 1984

[30] Foreign Application Priority Data

Apr. 19, 1983 [CH] Switzerland .......................... 2088/83

[51] Int. Cl.⁴ ............................................ B61D 17/00
[52] U.S. Cl. .................................... 105/340; 105/397;
 105/329 R; 296/25
[58] Field of Search ................................ 105/396–398,
 105/329 R, 340, 401; 296/25, 178

[56] References Cited

U.S. PATENT DOCUMENTS

| 2,519,049 | 8/1950 | Jergenson | 105/340 |
|---|---|---|---|
| 2,564,909 | 8/1951 | Kuhler et al. | 105/340 |
| 2,589,997 | 3/1952 | Dean et al. | 105/397 |
| 2,612,121 | 9/1952 | Kuhler et al. | 105/397 |
| 2,633,090 | 3/1953 | Murphy | 105/340 |
| 3,323,471 | 6/1967 | Dean et al. | 105/401 |
| 3,503,168 | 3/1970 | Eggert | 105/401 |

FOREIGN PATENT DOCUMENTS

| 0557089 | 2/1957 | Italy | 296/28 A |
|---|---|---|---|
| 0026991 | of 1905 | United Kingdom | 105/398 |

Primary Examiner—Robert B. Reeves
Assistant Examiner—Scott H. Werny
Attorney, Agent, or Firm—Bachman & LaPointe

[57] ABSTRACT

A vehicle body for railcars having endwalls and sidewalls of hollow metal sections connecting a roof and a floor comprises a floor having a first intermediate floor consisting of two portions extending from the endwalls toward each other, a second lower floor connected to the two extending portions and a third upper floor over the second floor wherein a plurality of triangular-shaped side plates connect the second lower floor and the third upper floor to the two extending portions at the corner of the side plates so as to uniformly distribute longitudinal forces to the floor while preventing the transfer of longitudinal forces to the sidewalls.

7 Claims, 1 Drawing Figure

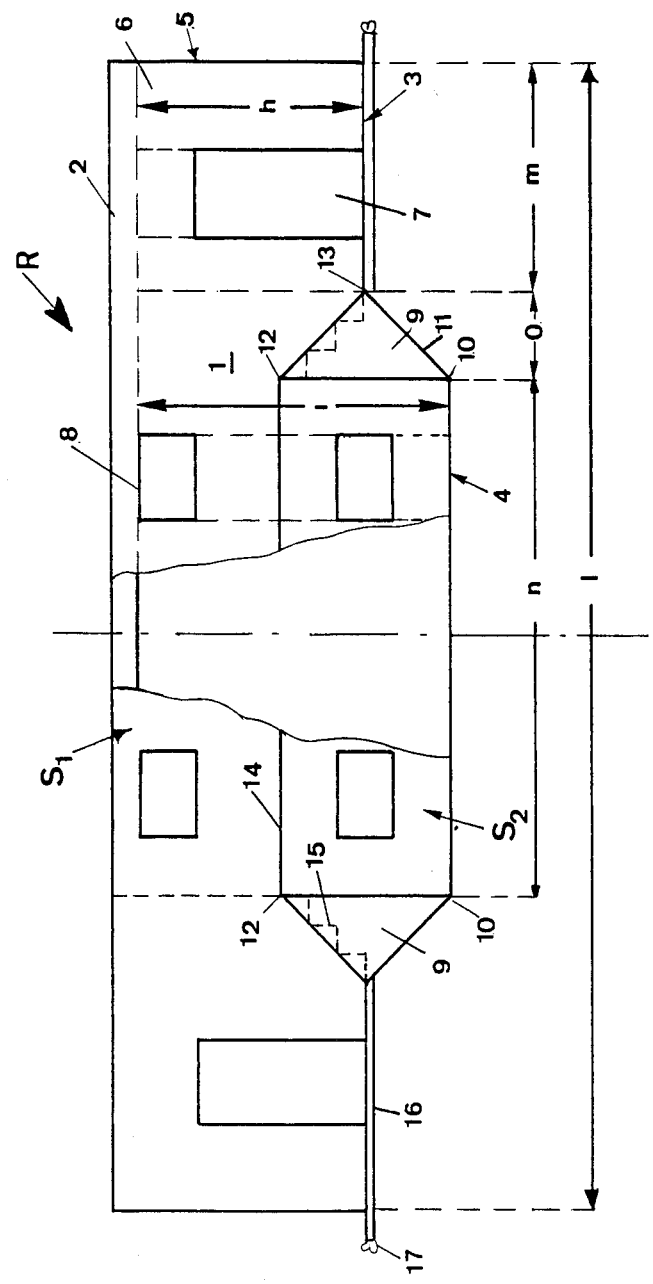

THREE LEVEL VEHICLE BODY FOR RAILCARS, WITH FORCE DISTRIBUTING TRIANGULAR SHAPED PLATES

BACKGROUND OF THE INVENTION

The present invention relates to a vehicle body, in particular for railcars, having sidewalls of hollow light metal sections, in particular hollow aluminum sections, connecting a roof and a floor.

Vehicle bodies are increasingly being made of light weight metal in order to reduce the weight of transport vehicles, in particular rolling stock, so that greater loads may be carried by the vehicles. Very often, however, problems arise with the transfer of tensile and compression forces acting on the body while in service. These forces act mainly in the direction of movement, that is, in the longitudinal direction of the vehicle. One of the features which helps accommodate these forces are longitudinal beams which are directly connected to the coupling facilities. Furthermore the sidewalls in particular are made of solid sections which run lengthwise the whole length of the vehicle. This enables the body to achieve adequate rigidity with respect to the above-mentioned forces; however, additional spars are necessary in order to achieve shape stability.

The object of the present invention is to develop a car body structure which not only improves the transfer of longitudinal forces, but also makes it possible as a result of this improvement to accommodate a greater load.

SUMMARY OF THE INVENTION

The foregoing object is achieved by way of the present invention by providing a railcar having a floor comprising a first intermediate floor consisting of two portions extending from the endwalls toward each other, a second lower floor connected to the two extending portions and a third upper floor over the second floor wherein a plurality of triangular-shaped side plates connect the second lower floor and the third upper floor to the two extending portions at the corner of the side plates. If longitudinal forces now act on one portion of the first intermediate floor at one end of the vehicle, these forces are transferred and distributed uniformly to the second lower floor part and to the third upper floor part such that at the other end of the vehicle these forces are again brought together on the other portion of the intermediate floor part via side plates. Consequently forces are transmitted only within the floor parts. The sidewalls no longer have to accommodate longitudinal forces.

According to the present invention therefore the sidewalls are made out of hollow sections running perpendicular to the longitudinal axis of the vehcile body. These perpendicular lying sections can be made much lighter and, by prior shaping, much more accurately. Apart from this the assembly of the hollow sections to make a sidewall no longer represents a problem. It is also much easier to provide openings e.g. for doorways and window facilities and can be done more economically at an early stage of assembly.

To improve the transfer of forces the first intermediate floor parts and in individual cases also the upper floor should be reinforced with a network of transverse sections.

Fitting an upper floor has, furthermore, the great advantage that the vehicle body can be constructed with two floors which enables a greater load to be accommodated.

To transmit the longitudinal forces acting on the first intermediate floor parts it suffices to provide at least two side plates connecting up to the second lower floor part and third upper floor. Preferably, however there should be up to four side plates as this permits symmetrical transfer of forces. Between the individual side plates are stairs to the individual floors and such that for example toilets or the like facilities can be installed below the stairs leading to the upper floor.

BRIEF DESCRIPTION OF THE DRAWING

Further advantages, features and details of the present invention are revealed in the following description of an exemplified embodiment of the invention and with the aid of the single drawing showing a partly sectioned schematic representation of a vehicle body R, for example of a high speed railway train carriage.

DETAILED DESCRIPTION

A vehicle body R features sidewalls 1 which join up to a roof 2 and floor parts 3, 4 and 14. The floor is made up of two intermediate floor parts consisting of portions 3 extending from the end walls of the vehicle body toward each other. A second lower floor 4 and a third upper floor 14 are connected to each other in a manner to be described hereinbelow. The intermediate floor parts 3 are thus displaced with respect to lower floor part 4 by a distance equal to the difference between h and i and results in a body structure similar to a railcar with a recess in the floor.

The total length 11 of the vehicle body R comprises twice the length m of intermediate floor parts 3 plus the length n of lower floor part 4 and twice the height o of a side plate 9 at a lower corner 10, the said plate 9 having a side 11 running from mid-corner 13 connecting intermediate floor parts 3 to lower floor part 4. Inserted between the upper corners 12 facing lower corners 10 of side plates 9 is an upper floor 14 which divides the vehicle body R into two floors $S_1$ and $S_2$.

Of the side plates 9 according to the invention there are at least two, however preferably three to four connecting intermediate floor parts 3 to lower floor part 4, and such that stairs 15 (indicated by broken lines) leading to floors $S_1$, $S_2$ are provided between the individual side plates 9. A preferred arrangement would thus give the following sequence: Sidewall - side plate - stairs to $S_2$ - side plate - stairs to $S_1$ - side plate - stairs to $S_2$ - side plate - sidewall.

If desired, a longitudinal beam 16 with coupling facility 17 (indicated schematically here) can be provided below intermediate floor part 3.

The vehicle body rests on wheel axles which are shown here.

The intermediate floor parts 3 and lower floor part 4 and, if desired or necessary, upper floor part 14 are preferably reinforced with a network of transverse spars which for reasons of clarity are not shown here.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A vehicle body for railcars having endwalls and sidewalls of hollow metal sections connecting a roof and a floor wherein said floor comprises a first intermediate floor consisting of two portions extending from the endwalls toward each other, a second lower floor connected to said two extending portions and a third upper floor over said second lower floor the improvement comprising a plurality of triangular shaped side plates connecting said second lower floor and said third upper floor to said two extending portions at the corners of said side plates to as to uniformly distribute longitudinal forces to said floor while preventing the transfer of longitudinal forces to said sidewalls.

2. A vehicle body according to claim 1 wherein at least two side plates connecting the floor parts are provided.

3. A vehicle body according to claim 1 wherein four side plates connecting the floor parts are provided.

4. A vehicle body according to claim 3 wherein said plurality of side plates are built integrally into each sidewall.

5. A vehicle body according to claim 1 wherein stairs are provided between said plurality of side plates.

6. A vehicle body according to claim 3 wherein stairs are provided between said side plates and said sidewalls.

7. A vehicle body according to claim 1 wherein the sidewalls are made up of hollow sections arranged perpendicular to the longitudinal axis of the vehicle body, the said sections featuring openings for doors and windows.

* * * * *